Patented Mar. 24, 1936

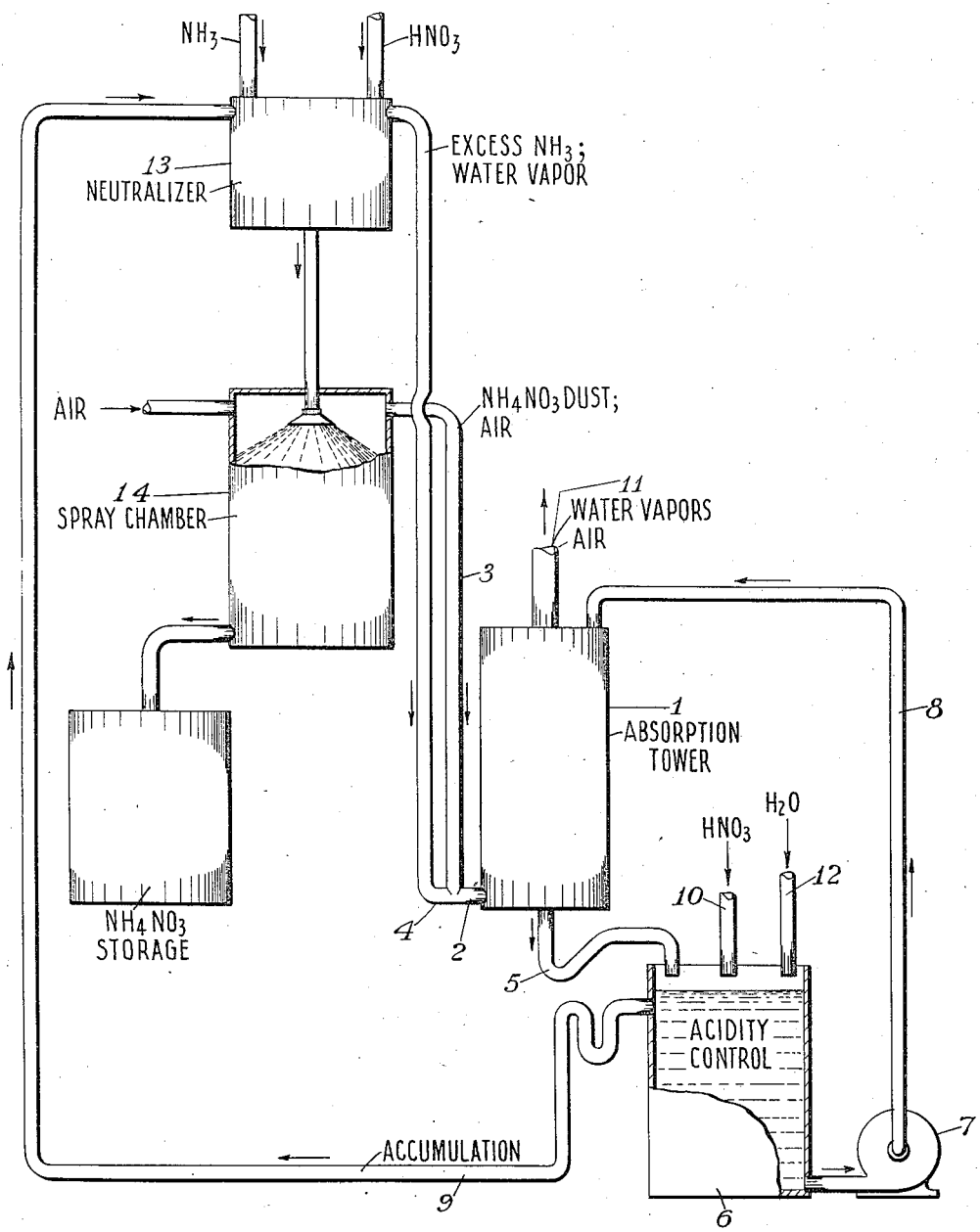

2,034,864

UNITED STATES PATENT OFFICE 2,034,864

AMMONIA RECOVERY PROCESS

Stanley L. Handforth, Woodbury, N. J., assignor to E. I. du Pont de Nemours & Company, Wilmington, Del., a corporation of Delaware Application October 10, 1933, Serial No. 692,926

6 Claims. (Cl. 23—103)

This invention relates to a process for the production of ammonium salts by the reaction of ammonia with an aqueous solution of an acid, and more particularly to a process for the production of ammonium nitrate by the neutralization of nitric acid with ammonia, with recovery of the excess ammonia vapors.

The reactions between ammonia and acids, and particularly between ammonia and nitric acid, are highly exothermic, and the heat of reaction, if efficiently utilized, is sufficient to volatilize most of the water present. During such a neutralization process, on a plant scale, it is practically impossible to control the addition of the reactants so that the solution is always neutral. Since both nitric acid and ammonia are volatile materials, there is a considerable loss of valuable vapors during neutralization, regardless of whether the reaction is kept on the acid or alkaline side. Furthermore, because of the corrosive action of nitric acid at elevated temperatures on the materials commonly used in the reaction vessels, it has been found desirable to maintain the ammonium nitrate solution on the ammoniacal side throughout the neutralization.

An object of this invention is an improved process for the production of ammonium salts by the reaction of ammonia with an aqueous solution of an acid, wherein an excess of ammonia is maintained throughout the reaction. A further object is such a process for the production of ammonium nitrate from ammonia and nitric acid, in which the excess ammonia is recovered and returned to the process. A still further object is such a process, in which a high yield of ammonium nitrate is obtained and in which material losses are avoided. Additional objects will be apparent from the disclosure hereinafter.

I have found that the foregoing objects are accomplished, in the manufacture of ammonium salts, if an excess of ammonia is maintained in the reaction chamber throughout the neutralization and if the excess ammonia, together with the water vapors given off, is removed from the reaction chamber and said ammonia is recovered by passing it through a hot continuously acidified solution of the same ammonium salt. In carrying out such a process in the manufacture of ammonium nitrate, for example, the high temperature resulting from the exothermic heat of the reaction between ammonia and nitric acid makes certain that practically none of the excess ammonia will remain dissolved in the ammonium nitrate, but that all will pass out of the neutralizing chamber, together with the water vapor evolved.

According to my invention, when ammonium nitrate is being produced, the mixed vapors from the neutralizer are contacted with a solution of ammonium nitrate in a packed tower or other suitable apparatus, the solution being continuously maintained at the desired acidity by the addition of the proper amount of nitric acid, in order to assure the retention of the ammonia vapors. While the circulating ammonium nitrate solution may have any desired strength, it will desirably be a concentrated solution, containing between 55 and 85% ammonium nitrate.

The procedure for absorbing the ammonia vapors from the neutralizer will preferably take place in a continuous process for the manufacture of ammonium nitrate, in which there is a maintained circulation of the ammonium nitrate solution and return of the increase to the neutralizer. The strength of the ammonium nitrate solution in the neutralizer will be approximately within the limits given in the foregoing, and for this reason the concentration of the absorbing solution is maintained as described.

The water vapors coming from the neutralizer along with the excess of gaseous ammonia and entering the ammonium nitrate solution, will tend by condensing to dilute this solution. On the other hand, the incoming ammonia vapors will react with the excess nitric acid present and evolve heat. In order to control the water content of the solution and the amount of water vapor eliminated, the temperature of the solution may be closely controlled by external means, for example, by steam or water coils within the solution. Also a current of hot air may, if desired, be passed through the solution to assist in carrying off excess water vapor.

While it is necessary that the ammonium nitrate solution be maintained continuously acid for the complete absorption of the ammonia vapors, it is undesirable that this acidity be excessive, since in this case a loss of neutralized material would result through the formation of fog. Preferably, the acidity is maintained at less than 1% and most desirably lower than 0.5% $HNO_3$.

The method, according to my invention, for recovering the excess ammonia vapors is particularly applicable to a continuous process for producing ammonium nitrate. I find it to have an even greater advantage when applied in connection with a process in which the neutralized solution, sufficiently concentrated, is solidified in finely divided form by a spraying process. In such a process, a considerable current of air meets the liquefied product coming from the spraying device. Since a portion of the solid product is present in a very finely divided state, considerable loss to the process may result in spite of special collecting means, because of this finely divided material being carried off by the exhausted air. I find it desirable, therefore, to intimately contact the outgoing air supply from the spray chamber, together with the excess ammonia and water vapors, from the neutralizer with the ammonium nitrate absorbing solution. Working in such a manner, the losses in yield are reduced to a minimum with no additional operating procedure, while at the same time the excess water is eliminated.

One embodiment of my invention is shown diagrammatically in the accompanying drawing in which 1 represents a tower filled with suitable packing material, over which an ammonium nitrate solution of approximately 80% concentration, maintained continuously acid with a content of not more than 0.5% nitric acid, is circulated. The excess gaseous ammonia from the neutralizing process, together with the accompanying water vapor, come from the neutralizer 13 through pipe 4, and enter the absorber tower through 2, being joined prior to their entrance into the tower by the air supply from the spray chamber 14 with its content of suspended ammonium nitrate, this air supply entering through pipe 3. The vapors and ammonium nitrate dust are intimately contacted with the acidified solution in 1, so that all the ammonia is fixed in the form of additional ammonium nitrate, while the solid nitrate is dissolved. The absorbing tower preferably contains both steam and water coils for controlling the temperature of the ammonium nitrate solution, so that the desired amount of water vapor may be eliminated through the exit 11. For control purposes, the ammonium nitrate solution circulates through pipe 5 to the open container 6, where the degree of acidity may be tested. Additional nitric acid may be added, as required, through 10, while water for the purpose of cooling or diluting may be introduced through 12. Pump 7 circulates the solution to the top of the tower through line 8, and line 5 allows it to return to the container 6. The accumulation due to neutralization and solution is continuously returned to the other part of the process through 9.

In the foregoing embodiment, my invention has been described with particular reference to the production of ammonium nitrate. It will be apparent, however, that it may be applied equally well to the manufacture of any ammonium salt made by the reaction of ammonia with an aqueous solution of an acid, where the reaction is maintained continuously on the ammoniacal side. As examples of such additional salts, I may cite ammonium chloride and ammonium acetate. It will further be apparent that the process is not limited to the use of the heat of neutralization resulting from the reaction, but is equally applicable in cases where additional external heat is supplied to the neutralizing vessel for the purpose of further increasing the concentration of the resulting solution.

While I have described my invention with considerable detail, it should be understood that many departures from the detailed procedure may be made. I intend, therefore, to be limited only as indicated in the following patent claims:

I claim:

1. The process of producing ammonium salts, which comprises reacting ammonia with an aqueous acid solution, continuously maintaining an excess of ammonia throughout the reaction, thus to continuously maintain the resulting ammonium salt solution on the ammoniacal side throughout the neutralization, removing the excess ammonia and water vapor from the reaction chamber, recovering said ammonia by absorption in a solution continuously maintained essentially of the ammonium salt somewhat acidified, and allowing the excess water vapor to escape.

2. The process of producing ammonium nitrate, which comprises reacting ammonia with nitric acid in aqueous solution, continuously maintaining an excess of ammonia throughout the reaction, thus to continuously maintain the resulting ammonium nitrate solution on the ammoniacal side throughout the neutralization, removing the excess ammonia and water vapor from the reaction chamber, recovering said ammonia by absorption in a solution continuously maintained essentially of ammonium nitrate somewhat acidified, and allowing the excess water vapor to escape.

3. The process of producing ammonium nitrate, which comprises reacting ammonia with nitric acid in aqueous solution, continuously maintaining an excess of ammonia throughout the reaction, thus to continuously maintain the resulting ammonium nitrate solution on the ammoniacal side throughout the neutralization, removing the excess ammonia and water vapor from the reaction chamber, recovering the ammonia by absorption in a solution continuously maintained essentially of ammonium nitrate, said solution having a continuously maintained acidity not exceeding 1.0% $HNO_3$, returning the thus produced ammonium nitrate solution to the process, and allowing the excess water vapor to escape.

4. The process of producing ammonium nitrate, wherein the final product is obtained in the form of a finely divided material by spraying an ammonium nitrate solution of sufficiently high concentration to yield a solid product, which comprises reacting ammonia with nitric acid in aqueous solution, continuously maintaining an excess of ammonia throughout the reaction, thus to continuously maintain the resulting ammonium nitrate solution on the ammoniacal side throughout the neutralization, spraying the concentrated ammonium nitrate solution to form a finely divided solidified product, removing the excess ammonia and water vapors from the reaction chamber, passing said mixed vapors, together with the air effluent from the spraying operation carrying suspended ammonium nitrate particles, into a solution continuously maintained essentially of ammonium nitrate somewhat acidified, and allowing the air and excess water vapor to escape.

5. The process according to claim 2, wherein the process of producing ammonium nitrate is a continuous one and where there is a continuous return to the neutralization process of the ammonium nitrate solution in which the excess ammonia vapors have been fixed.

6. The process according to claim 2, in which: the ammonium nitrate solution for absorption of the ammonia vapors has a concentration maintained at 55 to 85% $NH_4NO_3$, the neutralization process is controlled to produce an ammonium nitrate solution of approximately 55 to 85% $NH_4NO_3$ and there is a continuous return to the neutralization process of the ammonium nitrate solution in which the excess ammonium vapors have been fixed.

STANLEY L. HANDFORTH.